UNITED STATES PATENT OFFICE.

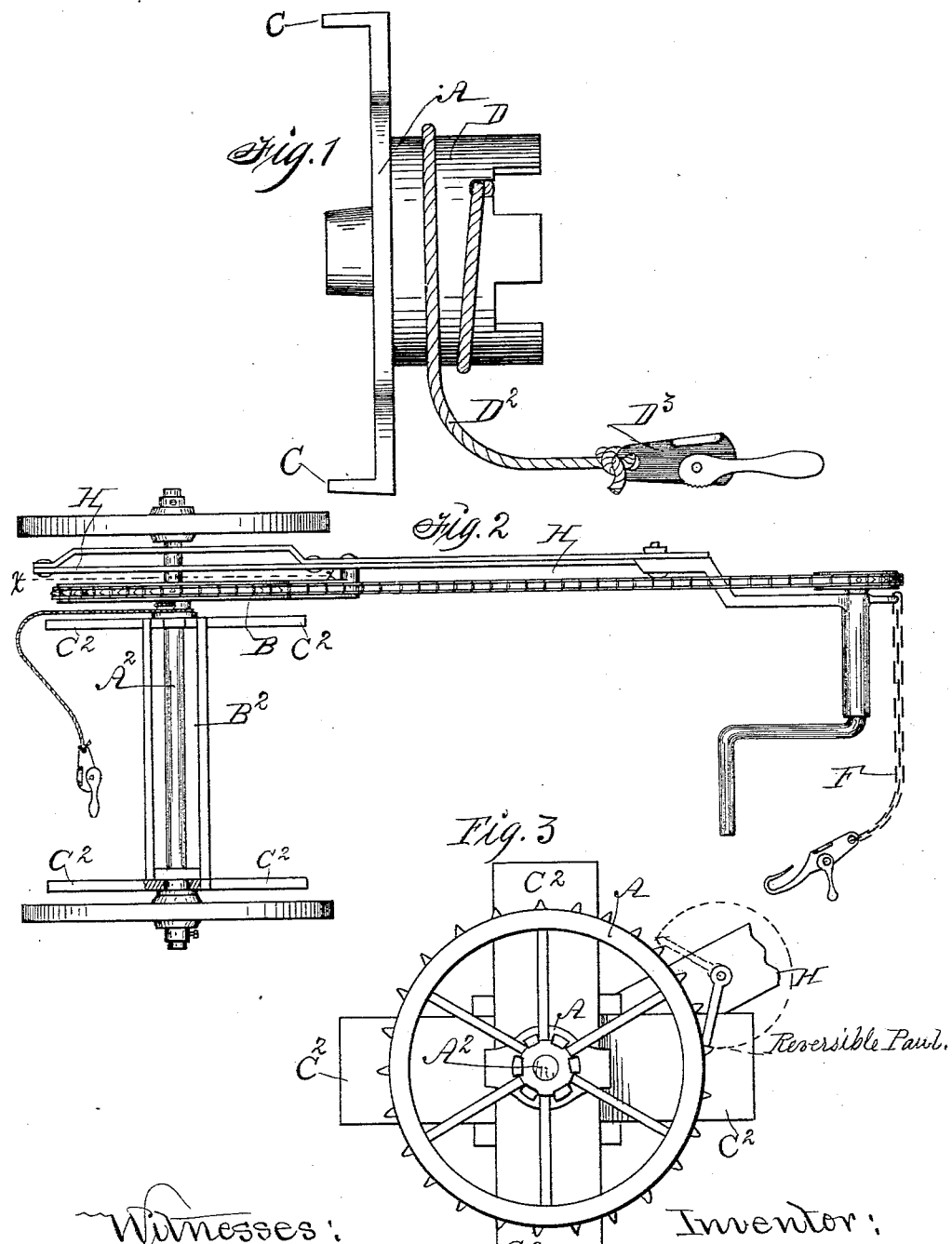

GEORGE E. DIXON, OF BEACON, IOWA.

WIRE REEL AND STRETCHER.

SPECIFICATION forming part of Letters Patent No. 476,525, dated June 7, 1892.

Application filed October 27, 1891. Serial No. 410,021. (No model.)

*To all whom it may concern:*

Be it known that I, GEORGE E. DIXON, a citizen of the United States of America, residing at Beacon, in the county of Mahaska and State of Iowa, have invented a new and useful Improvement in Wire Reels and Stretchers, of which the following is a specification.

My invention relates to a machine for which United States Letters Patent No. 444,317 were issued to me January 6, 1891, and also No. 456,985, August 4, 1891; and my object is to provide improved means for connecting the sprocket-wheel on the axle of the device with a spool which contains wire, and also to provide a drum of much smaller diameter than the spool upon which a portion of the wire may be wound while being stretched, as required, to obtain a purchase adapted to increase the power applied.

My invention consists in the construction and combination of a clutching device and drum with the axle, the sprocket-wheel, and a spool, as hereinafter set forth, pointed out in my claims, and illustrated in the accompanying drawings, in which—

Figure 1 is a side view of the complete clutching device and drum. Fig. 2 is a top view of the complete reel and stretcher, showing the clutch and drum applied, and illustrates the relative positions of the various parts. Fig. 3 is a vertical sectional view through the line X X of Fig. 2.

Referring to the accompanying drawings, A represents the clutching device and drum cast complete in one piece. It is adapted to be placed on the axle $A^2$ between the sprocket-wheel B and the spool of wire $B^2$. On its inside face or in juxtaposition to the spool are flanges C at opposite sides of the device, projecting inwardly and adapted to engage the edges of one of the cross-pieces $C^2$ on the end of the spool of wire, as clearly illustrated in Figs. 2 and 3, and projecting outwardly, or toward the aforesaid sprocket-wheel, is a concentric drum D of smaller diameter, the outer face of which is provided with alternate projections and interdental spaces to produce one of the mating portions of a clutch.

$D^2$ is a rope detachably connected with the drum A by inserting the end in an open slot, and a knot on the end of the rope retains it there.

By fastening one end of a broken wire to the clamp $D^3$ on the free end of the rope and the other end of the wire to the clamp on the free end of the anchor-chain F at the other end of the machine and then rotating the drum the two ends of the wire will be brought together, so that they can be twisted together, as required, to produce a splice.

By extending the beam or frame H rearward from the axle the rear end of the beam can engage a fixed fence-post to aid in keeping the machine stationary when in use for stretching a wire at the end or corner of a field. By forming a hook integral with the wire-clamping device on the free end of the anchor-chain at the front end of the frame the chain can be readily taken around a fixed post and the hook inserted in one of its links to facilitate fastening the machine to the post.

J represents a sprocket-wheel, which is of common form, save that the spokes in its central portion and in juxtaposition to the drum D have angular formations with interdental spaces between them adapted to coact with the outer face of the drum D to produce a clutching device.

I claim as my invention—

1. An attachment for wire reeling and stretching machines, consisting of a drum adapted to be placed on an axle and having means at its one edge to engage the end portion of a spool of wire and means at its other end adapting it to clutch a sprocket-wheel, substantially in the manner set forth, and for the purposes stated.

2. An improved means for connecting a sprocket-wheel and spool of wire in a wire reeling and stretching device, consisting of a drum having an enlarged face at its one end, with flanges at its top and bottom, adapted to overlap the edges of one of the cross-pieces on the end of a spool of wire and provided at the other end with projections having interdental spaces between them, that portion of the sprocket-wheel in juxtaposition thereto having coacting projections, as required, to produce a clutch, as and for the purposes stated.

3. A combined drum and clutch consisting of a cylinder having one end open and projections on said end, adapted to enter corresponding openings in a sprocket-wheel and the other end partially closed and a bearing in the center to admit an axle, and flanged extensions at the closed end, adapted to engage the frame of a spool for fence-wire, in combination with the rotating axle of the carriage of a wire reel and stretcher and a sprocket-wheel fixed to said axle, to operate in the manner set forth, for the purposes stated.

GEORGE E. DIXON.

Witnesses:
J. RALPH ORWIG,
THOMAS G. ORWIG.